United States Patent
Noro et al.

(10) Patent No.: US 8,688,373 B2
(45) Date of Patent: Apr. 1, 2014

(54) NAVIGATION APPARATUS

(75) Inventors: Satoru Noro, Nagoya (JP); Seiji Kato, Toyota (JP)

(73) Assignee: DENSO CORPORATION, Kariya (JP)

( * ) Notice: Subject to any disclaimer, the term of this patent is extended or adjusted under 35 U.S.C. 154(b) by 245 days.

(21) Appl. No.: 13/359,681

(22) Filed: Jan. 27, 2012

(65) Prior Publication Data

US 2012/0197525 A1     Aug. 2, 2012

(30) Foreign Application Priority Data

Jan. 31, 2011    (JP) ................................. 2011-018104

(51) Int. Cl.
   *G08G 1/123*    (2006.01)
(52) U.S. Cl.
   USPC ......................................................... 701/437
(58) Field of Classification Search
   None
   See application file for complete search history.

(56) References Cited

U.S. PATENT DOCUMENTS

2007/0055444 A1    3/2007    Mikame

FOREIGN PATENT DOCUMENTS

| JP | A-2002-202146 | 7/2002 |
|----|---------------|--------|
| JP | A-2004-251790 | 9/2004 |
| JP | A-2006-138798 | 6/2006 |
| JP | A-2006-234565 | 9/2006 |
| JP | A-2007-140033 | 6/2007 |
| JP | A-2010-101709 | 5/2010 |
| JP | A-2011-007504 | 1/2011 |

OTHER PUBLICATIONS

Office Action mailed Jan. 29, 2013 in corresponding JP Application No. 2011-018104 (and English translation).

*Primary Examiner* — Thomas Tarcza
*Assistant Examiner* — Garrett Evans
(74) *Attorney, Agent, or Firm* — Posz Law Group, PLC

(57) ABSTRACT

A control circuit of a navigation apparatus acquires exit port information in a rotary intersection for route guidance. It is determined whether a guidance point or guidance target used as an exit path from the rotary intersection is a learned road acquired by the road learning function. When the exit path is not a learned road, namely, when the exit path is an existing road in a ready-made map data, an "exit path guidance for existing roads" aimed at an exit port to an existing road is executed. In contrast, when the exit path from the rotary intersection is a learned road, an "exit path guidance for learned roads" aimed at an exit port to a learned road is executed.

14 Claims, 6 Drawing Sheets

EXITING FROM EXISTING ROAD

EXITING FROM LEARNED ROAD

LEARNED ROAD PASSING INSIDE OF ROTARY

LEARNED ROAD PASSING OUTSIDE OF ROTARY

ADDITION TYPE

BRANCH TYPE

PROXIMITY TYPE

ADDITION TYPE

BRANCH TYPE

PROXIMITY TYPE

US 8,688,373 B2

NAVIGATION APPARATUS

CROSS REFERENCE TO RELATED APPLICATION

This application is based on Japanese Patent Application No. 2010-18104 filed on Jan. 31, 2011, the disclosure of which is incorporated herein by reference.

TECHNICAL FIELD

The present invention relates to a navigation apparatus which executes a route guidance based on map data, and executes a route guidance using learned road data obtained based on travel experience of a vehicle.

BACKGROUND

[Patent document 1] JP-2007-71601 A (US 2007/0055444 A1)

There is known a navigation apparatus in a subject vehicle to learn a new road not registered in existing ready-made map data based on a travel locus or travel track of a moving object such as a vehicle. The road learning function is to prepare and store or recorded a new road (learned road) not existing in map data based on a travel track from a spot where a present position of the moving object separates from an existing road in the map data to a spot where the present position returns into an existing road in the map data, thereby learning a new road which has not been registered in the map data.

Incidentally, an in-vehicle navigation apparatus provides a route guidance method for a rotary intersection (i.e., a traffic circle, roundabout, rotary). For example, please refer to Patent document 1. Conventionally, the guidance for a rotary intersection uses an exit port number mode, which presents what number exit port after entering a rotary intersection should be used to exit from the rotary intersection, e.g., "please exit at the second exit path ahead."

By the way, the above conventional rotary intersection guidance does not consider a guidance method for the case where the learned road acquired by the road learning function is connected with a rotary intersection existing in the map data. That is, there is a case where the conventional rotary intersection guidance applies to a rotary intersection where the existing road and the learned road acquired by the road learning function are intermingled in the map data, thereby causing various situations.

For instance, suppose that a learned road linked to a rotary intersection passes inside of the rotary portion. Traveling this learned road signifies traversing the rotary intersection. There is a possibility that a vehicle goes through a private road or a private site and takes a shortcut against a regulation. Therefore, it is not necessarily appropriate to carry out the same route guidance for such a learned road as that for another existing exit path.

In contrast, the above rotary intersection guidance using the exit port number mode may use the following assumption. That is, when the existing road and the learned road are intermingled as exit ports (exit paths) exiting from the rotary intersection, a series of exit port numbers may be assigned to an existing road and a learned road without considering the difference between the existing road and the learned road. Thereby, based on the thus assigned exit port numbers, the exit path guidance from the rotary intersection may be executed. Further, the learned road may be cancelled from the registration by a user when the learning result is unsuitable. In addition, a new exit path may be added as a learned road in the rotary intersection. In this case, each time a learned road is deleted from the rotary intersection or added into the rotary intersection, the exit port numbers that are used for the route guidance are changed. This may confuse a user.

SUMMARY

It is an object of the present invention to provide a navigation apparatus which has a road learning function and achieve a route guidance method suitable for a rotary intersection containing a learned road.

To achieve the above object, according to an example of the present invention, a navigation apparatus in a vehicle is provided for executing a route guidance using a ready-made map data and a learned road data. The learned road data records a learned road that is generated based on a travel track that ranges from a position located when a present position of the vehicle separates from an existing road in the map data or an already registered learned road already recorded in the learned road data up to a position located when a present position of the vehicle returns to an existing road in the map data or an already registered learned road already recorded in the learned road data. The navigation apparatus is further provided as follows. A guidance section is included to present an exit path guidance relative to an exit path of a guidance target via which the vehicle is to exit from a rotary intersection at a predetermined time point when a designated guidance route is to pass through the rotary intersection and exit from the rotary intersection via the exit path of the guidance target. A determination section is included to determine whether an exit path of a guidance target by the guidance section for exiting from the rotary intersection corresponds to (i) an existing road stored in the map data or (ii) a learned road recorded in the learned road data. The guidance section is further configured to execute an exit path guidance in line with a rotary intersection guidance of a predetermined mode based on the map data when the exit path of the guidance target is determined to correspond to an existing road stored in the map data, and to execute an exit path guidance in line with a rotary intersection guidance of a learned road guidance mode different from the predetermined mode when the exit path of the guidance target is determined to correspond to a learned road recorded in the learned road data.

Under such a configuration, an exit path guidance can be differentiated from each other in the first and second cases. That is, in the first case, an exit path guidance is executed with respect to an existing road in the ready-made map data. In the second case, an exit path guidance is executed with respect to a learned road acquired by the road learning function. That is, when passing through an exit path existing in the map data in the rotary intersection, a predetermined rotary intersection guidance can be made based on the ready-made map data. Thus, the exit path guidance is made so as not to mix up the existing road and the learned road. Therefore, even if the addition and/or deletion of a learned road is made in association with a rotary intersection, the guidance information is kept unchanged in the contents of the information when the guidance route passes through an exit path of an existing road in the conventional map data. This prevents the confusion of the user. In addition, the guidance method can be differentiated from each between the case where an exit path corresponds to an existing road, and the case where an exit path corresponds to a learned road. It thus becomes easy and convenient for the user to recognize that the guided exit path is a learned road.

According to another example of the present invention, a method for executing an exit path from a rotary intersection by a navigation apparatus in a vehicle is provided by using a ready-made map data and a learned road data, the learned road data recording a learned road that is generated based on a travel track that ranges from a position located when a present position of the vehicle separates from an existing road in the map data or an already registered learned road up to a position located when a present position of the vehicle returns to an existing road in the map data or an already registered learned road. The method includes: designating a guidance route to pass through a rotary intersection and exit from the rotary intersection via an exit path of a guidance target; determining whether an exit path of the guidance target in the designated guidance route for exiting from the rotary intersection corresponds to (i) an existing road stored in the map data or (ii) a learned road recorded in the learned road data; and executing an exit path guidance in line with a rotary intersection guidance of a predetermined mode based on the map data when the exit path of the guidance target is determined to correspond to an existing road stored in the map data, whereas executing an exit path guidance in line with a rotary intersection guidance of a learned road guidance mode different from the predetermined mode when the exit path of the guidance target is determined to correspond to a learned road recorded in the learned road data.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION

The following describes an embodiment of the present invention with reference to drawings. In addition, without need of limiting to the following explanation of the embodiment, the embodiment of the present invention can be achieved in various different manners.

[Configuration of Navigation Apparatus]

Figure 1:
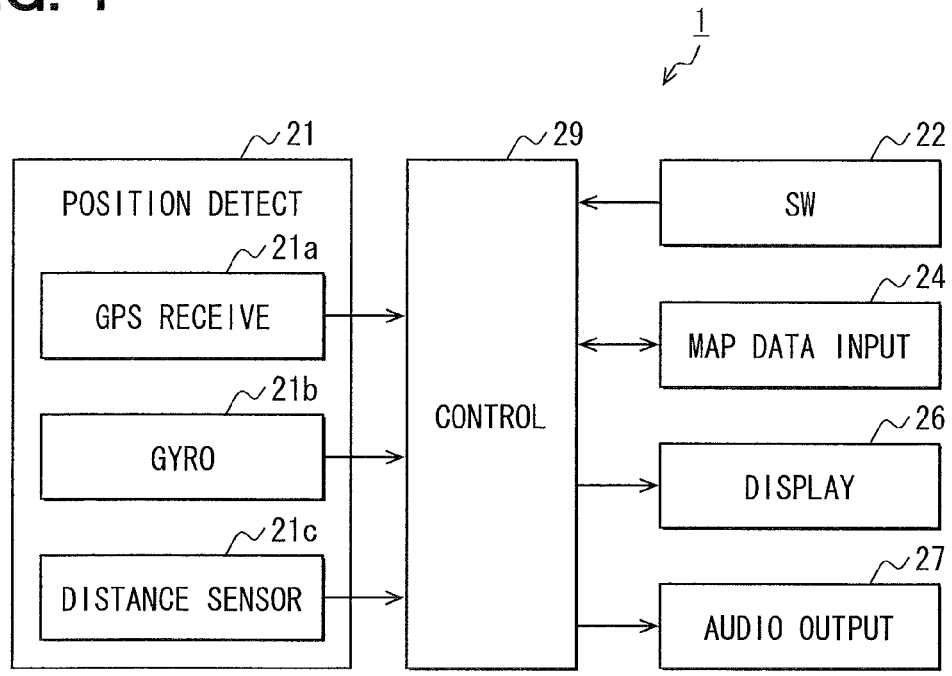
FIG. 1 is a block diagram showing a configuration of a navigation apparatus according to an embodiment of the present invention.

The navigation apparatus 1 of the present embodiment is mounted in a subject vehicle. As illustrated in FIG. 1, the navigation apparatus 1 includes a position detection instrument 21 for detecting a present position of the vehicle; a manipulation switch group 22 for inputting various instructions from a user; a map data input portion 24 to input data from a large data volume map storage medium for recording map data or programs; a display portion 26 for displaying a map or a variety of information; and an audio output portion 27 for outputting various kinds of guidance sounds; and a control circuit 29.

The position detection instrument 21 includes a GPS receiver which receives transmission signals from satellites for GPS (Global Positioning System) and is used for detecting a position coordinate and an altitude of the vehicle; a gyroscope 21b for outputting a detection signal according to an angle of a rotational movement exerted to the vehicle; and a distance sensor 21c which outputs a travel distance of the vehicle. Based on signals outputted from sensors or the like 21a to 21c, the control circuit 29 calculates a present position, direction, speed, etc. of the vehicle. In addition, although there are several methods to calculate a present position based on a signal outputted from the GPS receiver 21a, an independent positioning method or a relative positioning method may be used.

The manipulation switch group 22 includes a mechanical key switch arranged in a circumference of the display portion 26 and a touch sensitive panel integrated into a surface of a screen on the display portion 26. The map data input portion 24 is used for inputting into the control circuit 29 the various data stored or recorded in map data storage medium or an auxiliary storage medium storing learned road data relative to learned road acquired by the road learning function.

The map data storage medium stores or records a ready-made map data that is provided to users by a map data provider. The map data include road data which indicate road connection states using nodes corresponding to specific points such as intersections and links connecting between nodes, map data which include drawing data required for display of map images, map matching-use data, route guidance data, a program for operating the navigation apparatus 1; and design image data.

The auxiliary storage medium to store or record learned road data uses electrically or magnetically rewritable and non-volatile memory such as a hard disk or flash memory. The navigation apparatus 1 of the present embodiment has a road learning function. When a new road is detected which is not included in roads existing in the map data or already registered learned roads, a learned road data of the detected new learned road is stored or recorded in the auxiliary storage medium. The learned road data include connection state information which indicates connection states of roads using nodes corresponding to the connection positions and links connecting nodes, and link configuration information.

The display portion 26 is a color display device having a display screen such as a liquid crystal display. The display portion 26 can display various images on the display screen according to inputs of video signals from the control circuit 29. This display portion 26 is used for displaying a map image, a guidance route from a departure point to a destination, a mark indicating a present position of the vehicle, and guidance information. The audio output portion 27 is used for notifying a user of a variety of information by speech or audio. Thus, various route guidances such as a direction guidance can be notified to a user in both image displaying via the display portion 26 and audio sounding via the audio output portion 27.

The control circuit 29 includes a known microcomputer having a CPU, ROM, RAM, I/O, and a bus line connecting the foregoing components or the like. The control circuit 29 performs the various processes based on program or data read from the ROM, and map data input portion 24. This control circuit 29 may function as a control means and a determination section, device, or means.

[Operation]

The following explains a process executed by the control circuit 29. For example, the processes relative to navigating include a map display process, and a route guidance process. The map display process calculates a present position of the vehicle based on the detection signal from the position detection instrument 21, and generates a map image based on the map data of a vicinity surrounding the present position read from the map data input portion 24, thereby causing the display portion 26 to display the map image of the vicinity of the present position. In addition, the control circuit 29 superimposes a mark which indicates the present position of the subject vehicle detected using the detection signal from the position detection instrument 21 on the map image displayed on the display portion 26, and scrolls the mark of the present position along with the travel of the subject vehicle.

The route guidance process performs as follows. When the user manipulates the manipulation switch group 22 to thereby designate a destination, the control circuit 29 designates the present position of the vehicle as a departure position, and retrieves an optimal route from the departure position to the destination using the road data read from the map data input portion 24. The control circuit 29 designates the optimal route retrieved by the route retrieval as a guidance route, and causes the display portion 26 to superimpose the guidance route on the map image. The control circuit 29 outputs guidance information by display or audio at predetermined time points along with the travel of the subject vehicle, and guides the subject vehicle to travel the guidance route up to the destination.

Furthermore, as explained above, the navigation apparatus 1 of the present embodiment has a road learning function. That is, when the subject vehicle travels a region other than (i) an existing road that is registered or recorded in the map data or (ii) a learned road that has been already registered, a data of a new road is prepared based on the travel locus at that time. The generated data of the new road is registered as a learned road in the auxiliary storage medium of the map data input portion 24. The control circuit 29 reads the learned road data registered in the auxiliary storage medium, and the existing road data in the map data, respectively, and processes two data so that consistency may be maintained as a single map data, and then use this single map data for the map display process or the route guidance process.

For instance, the control circuit 29 identifies present positions using the position detection instrument 21 periodically during the travel of the subject vehicle, and generates a learned road data based on a travel track from the separating position up to the returning position. The separating position is a position where the subject vehicle separates from an existing road in the map data or an already registered learned road; the returning position is a position where the subject vehicle returns to the existing road in the map data or the already registered learned road. This generated learned road data is recorded in the auxiliary storage medium. This learned road data include a group of: the nodes equivalent to the separating position and the returning position; connection information which indicates a connection state of a road which consists of a link which connects the above two nodes; and coordinate points which indicates a road configuration (i.e., link configuration) between the separating position and the returning position.

[Exit Path Guidance of Rotary Intersection Guidance (First Embodiment)]

Figure 2:
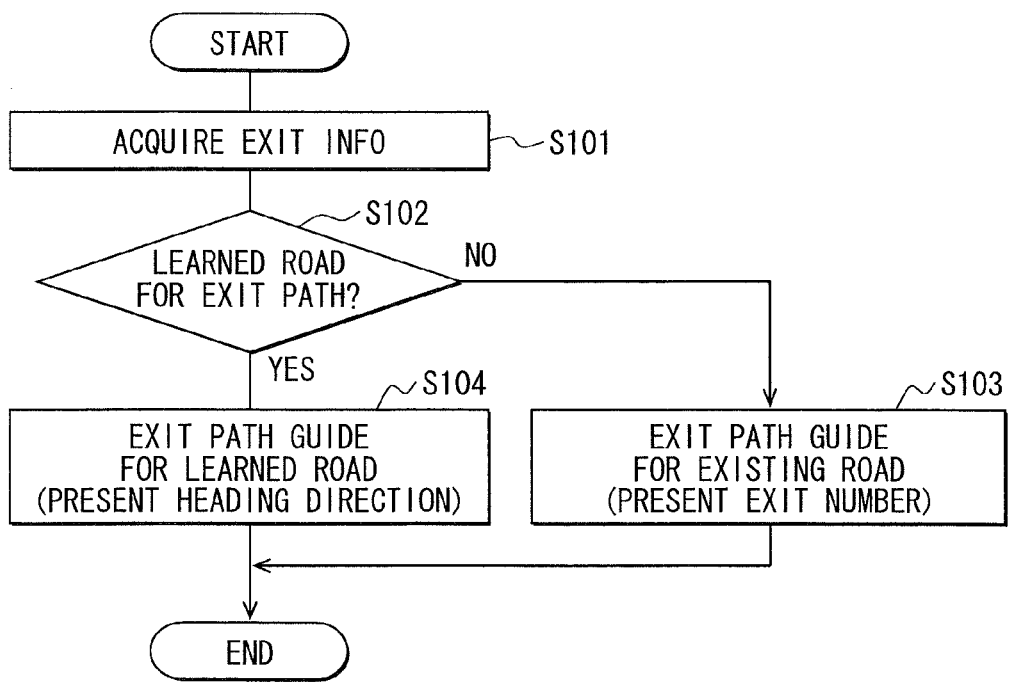
FIG. 2 is a flowchart diagram illustrating a procedure of an exit path guidance process for a rotary intersection according to a first embodiment.

An exit path guidance process of a rotary intersection according to a first embodiment is explained with reference to a flowchart of FIG. 2. The present process is a characteristic process executed by the control circuit 29. Further, the execution of the present process is started when the subject vehicle reaches a position having a predetermined distance to a rotary intersection during the execution of the route guidance process mentioned above.

It is further noted that a flowchart or the processing of the flowchart in the present application includes sections (also referred to as steps), which are represented, for instance, as S101. Further, each section can be divided into several subsections while several sections can be combined into a single section. Furthermore, each of thus configured sections can be referred to as a device, means, module, or processor and achieved not only as a software section in combination with a hardware device but also as a hardware section. Furthermore, the software section may be included in a software program, which may be contained in a non-transitory computer-readable storage media as a program product.

When starting the exit path guidance process of the rotary intersection, the control circuit 29 acquires exit port information in the rotary intersection necessary for route guidance (hereinafter referred to as a guidance target exit port information or exit port information on a guidance target) via the map data input portion 24 (S101). It is noted that the exit port information of the rotary intersection signifies position information on an exit port of the rotary intersection, an exit port to an exit path (existing road) recorded in a conventional map, or information to identify an exit port to an exit path registered in the learned road data.

Next, based on the exit port information acquired at S101, the control circuit 29 determines whether the guidance target exit port (i.e., the exit port of the guidance target or an exit path from the rotary intersection) is a learned road registered in the learned road data (S102).

When the exit path from the rotary intersection is not a learned road that is registered in the learned road data (S102: NO) (i.e., when the exit path is an existing road in the map data), the control circuit 29 executes an "exit path guidance for existing roads" aimed at the exit port to the existing road (S103). The present process is then ended. In the navigation apparatus 1 of the present embodiment, "exit path guidance for existing roads" uses a conventional rotary intersection guidance of an exit port number mode, which provides a guidance by indicating at what number exit port based on an entrance road the subject vehicle needs to exit from the rotary intersection, i.e., by indicating, of the several exit paths, a number of the exit path via which the subject vehicle needs to exit from the rotary intersection. For example, the guidance presents "please pass through the exit port one (1)."

In contrast, when the exit path from the rotary intersection is a learned road that is registered in the learned road data (S102: YES), the control circuit 29 executes an "exit path guidance for learned roads" aimed at the exit port to the learned road (S104). The present process is then ended. Further, the exit path guidance for learned roads is different from that for existing roads in respect of not presenting the exit port number. The exit path guidance for learned roads presents a heading direction to a guidance target exit path. For example, it presents "turn left" or "turn right" at a predetermined time point before reaching the guidance target exit port.

Figure 3A:
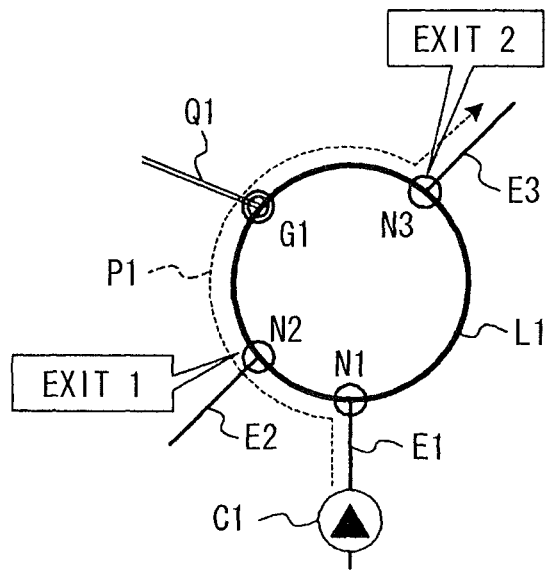
FIGS. 3A, 3B are diagrams schematically illustrating guidance information in rotary intersections.
Figure 3B:
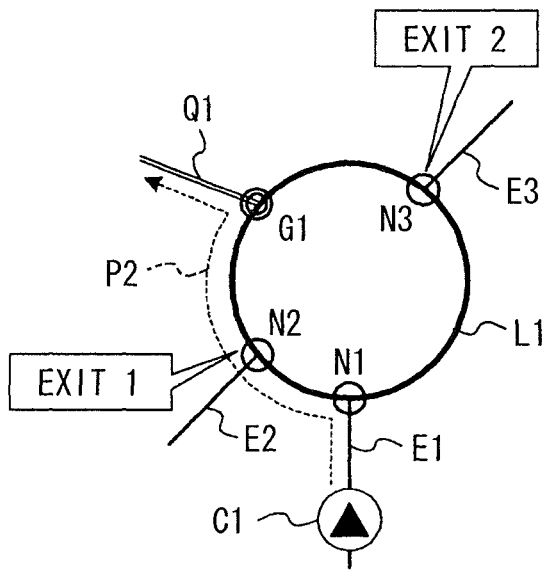

The above explanation indicates an outline of the exit path guidance in a rotary intersection guidance according to the first embodiment. The following will explain an example of each exit path guidance at S103 and S104 with reference to FIGS. 3A, 3B. FIGS. 3A, 3B indicate schematically examples of the routes of passing through the rotary intersection. C1 indicates a present position of the subject vehicle. L1 is a link of a rotary or cyclic part of the rotary intersection. Each of N1, N2, and N3 indicates an existing node that is a node to which an existing road in the conventional map data connects. Of those nodes N1, N2, N3, the node N1 is an existing node equivalent to an entrance port of the rotary intersection; the node N1 is connected to the link E1 of the existing road. Each of N2 and N3 is an existing node equivalent to an exit port of the rotary intersection. The node N2 is connected to the link E2 of an existing road. The node N3 is connected to the link E3 of an existing road. G1 is a learned node that is a node to which a learned road registered by the road learning function is connected. The node G1 is a learned node equivalent to an exit port of the rotary intersection; the node G1 is connected to the link Q1 of the learned road.

(1) Example of "Exit Path Guidance for Existing Roads (S103)"

With reference to FIG. 3A, the subject vehicle (C1) runs the link E1 of an existing road and enters the rotary intersection via the entrance port of the existing node N1. Further, the guidance route P1 of the subject vehicle is assumed to pass through the rotary portion L1 and exits from the exit port of an existing node N3 to the link E3 of an existing road. In this example, since the exit path from the rotary intersection is an existing road, the guidance uses the exit path guidance for existing roads at S103.

The exit path guidance for existing roads presents the exit port number of the exit port via which the subject vehicle exists from the rotary intersection. In this case, the exit port numbers are assigned only to the exit ports excluding an exit port, which a learned road is connected to, from all the exit ports of the rotary intersection. In the example indicated in FIG. 3A, the exit port numbers are designated as the consecutive numbers in an order from the position closer to the entrance port as follows. That is, the existing node N2 is assigned with "exit port 1", and the existing node N3 is assigned with "exit port 2." In executing the exit path guidance for the subject vehicle to exit from the exit port of the existing node N3 to the link E3, a message is reported which indicates "pass through the exit path of the exit port 2", for example.

Thus, the exit port number is designated only for the exit ports of the existing roads except the exit port of the learned road. Even if the link Q1 and the node G1 of the learned road are erased by the user or the exit port of the new learned road linked to this rotary intersection is added, the exit port numbers assigned to the existing nodes N2, N3 are maintained unchanged. That is, regardless of the deletion or the addition of a learned road, the contents of the exit path guidance for existing roads do not change.

It is assumed that the exit port numbers are assigned to all the exit ports including any exit port connected with any learned road. In this case, the existing node N2 is assigned with "exit port 1", the learned node G1 is assigned with "exit port 2", and the existing node N3 is assigned with "exit port 3." If the link Q1 and the node G1 of the learned road are erased by the user, the exit port number of the existing node N3 that is guided as "exit port 3" until then is newly assigned with "exit port 2". This may confuse the user. Further, if an exit port of a new learned road linked to this rotary intersection is added, the exit port number guided till then changes. This may confuse the user similarly.

Therefore, in order to avoid such confusion, the exit path guidance for existing roads presents the exit port number via which the subject vehicle should leave the rotary intersection, only by using the exit port numbers which are assigned to the exit ports of the existing roads except the exit ports of the learned roads.

(2) Example of "Exit Path Guidance for Learned Roads (S104)"

The example indicated in FIG. 3B assumes that the guidance route P2 passes through the link E1 of the existing road, enters the rotary intersection via the entrance port of the existing node N1, passes through the L1, and exit ports from the exit port of the learned node G1 towards the link Q1. In this example, since the exit path from the rotary intersection is a learned road, the guidance uses the exit path guidance for learned roads at S104.

Unlike the exit path guidance of existing roads, the exit path guidance for learned roads does not present the exit path guidance using the exit port number. Instead, a message which indicates the heading direction to the exit path is presented. For example, "turn left" is presented before the learned node G1 used as the exit port.

Suppose the case when exit port numbers are assigned to all the exit ports connected to all the exit paths including exit paths including learned roads. In such a case, the exit port numbers may be changed by deletion and the addition of the learned roads. This may confuse the user. In order to avoid such confusion, exit path guidance which uses the exit port numbers is not executed in the exit path guidance for learned roads.

[Exit Path Guidance in Rotary Intersection According to Second Embodiment]

Figure 4:
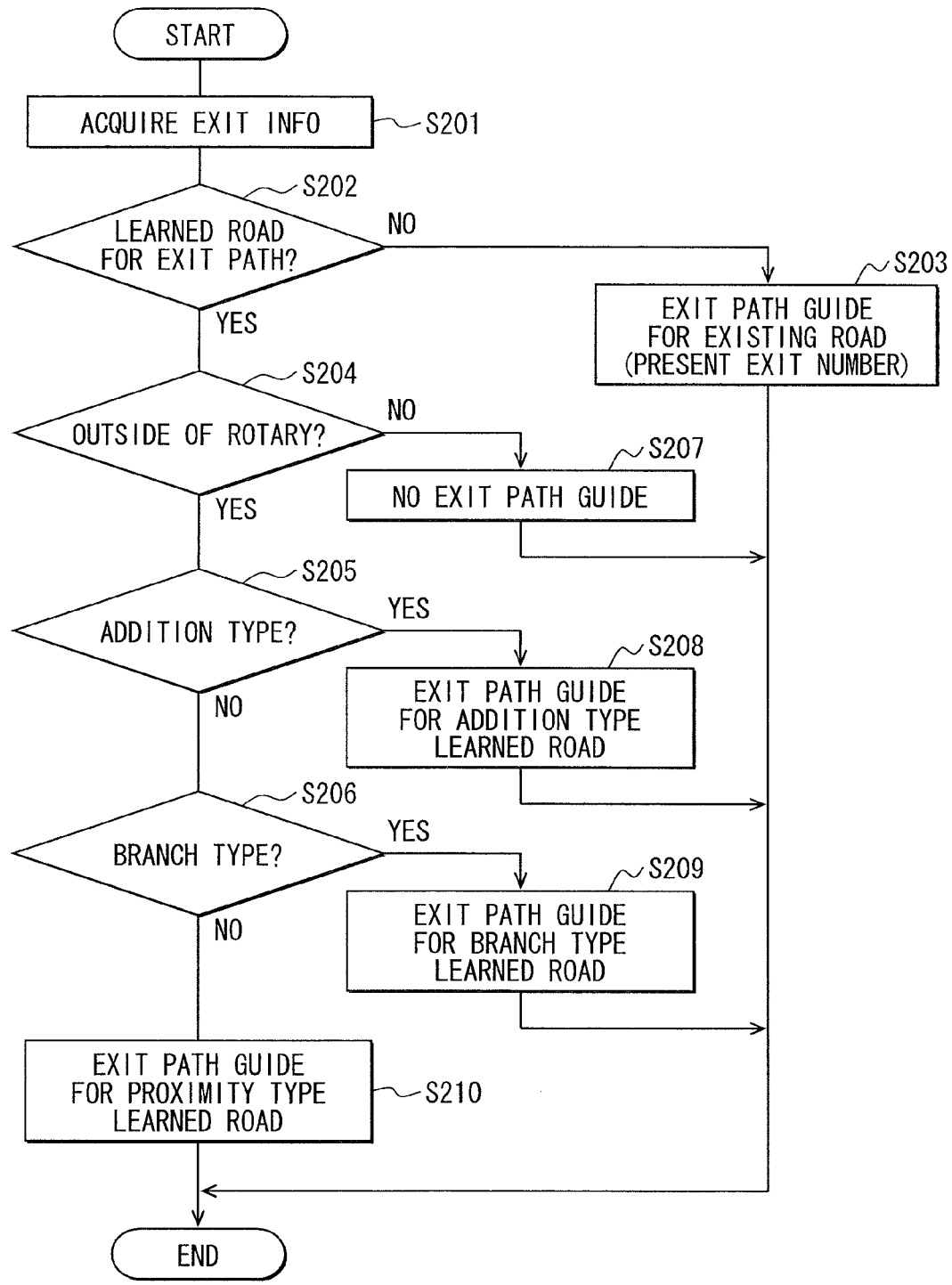
FIG. 4 is a flowchart diagram illustrating a procedure of an exit path guidance process for a rotary intersection according to a second embodiment.

An exit path guidance process of a rotary intersection according to a second embodiment is explained with reference to a flowchart of FIG. 4. This process is a characteristic process executed by the control circuit 29. Further, the execution of the present process is started when the subject vehicle reaches a position having a predetermined distance to a rotary intersection during the execution of the route guidance process mentioned above.

When starting the exit path guiding process of the rotary intersection, the control circuit 29 acquires exit port information in the rotary intersection for route guidance via the map data input portion 24 (S201). It is noted that the exit port information of the rotary intersection signifies position information on an exit port of the rotary intersection, an exit port to an exit path (existing road) recorded in a conventional map data, or information to identify an exit port to an exit path registered in the learned road data.

Next, based on the exit port information acquired at S201, the control circuit 29 determines whether the guidance target exit port (an exit path from the rotary intersection) is a learned road registered in the learned road data (S202).

When the exit path from the rotary intersection is not a learned road that is registered in the learned road data (S202: NO), or, when the exit path is an existing road in the map data, the control circuit 29 executes an "exit path guidance for existing roads" aimed at the exit port to the existing road (S203). The present process is then ended. The exit path guidance for existing roads is the same as that of the process at S103 in the first embodiment (refer to FIG. 2). Thus, detailed explanation is omitted.

In contrast, when the exit path from the rotary intersection is a learned road that is registered in the learned road data (S202: YES), it is determined, based on the configuration information of the link in the learned road data, whether the learned road passes through an outside or an inside of the cyclic part of the rotary intersection (S204). When the learned road corresponding to the exit path passes through the inside of the cyclic part of the rotary intersection (S204: NO), the processing proceeds to S207. The present process is ended without guiding the exit path.

In contrast, when the learned road corresponding to the exit path passes through the outside of the cyclic part of the rotary intersection (S204: YES), the processing proceeds to conditional determinations of S205 to S206. The conditional determinations of S205 to S206 determine whether the configuration of the connection of the learned road to the rotary intersection corresponding to the exit path is classified to one of three classifications of "addition type", "branch type", and "proximity type". The exit path guidance is made according to the determined configuration of the connection. Detailed explanation of the determination of the configuration of the connection of the "addition type", "branch type", and "proximity type" is mentioned later.

When it is determined that the learned road corresponding to the exit path is classified to the "addition type" (S205: YES), "Exit path guidance for addition type learned roads" is executed (S208), and the present process is ended. Further, when it is determined that the learned road corresponding to the exit path is classified to the "branch type" (S206: YES), "exit path guidance for branch type learned roads" is executed (S209), and the present process is ended. Further, when it is determined that the learned road corresponding to the exit path is not classified to "addition type" or "branch type" at S205 or S206 (S205: N0, S206: NO), it is determined that the learned road corresponding to the exit path is "proximity type", and "exit path guidance for proximity type learned roads" is executed (S210). The present process is then ended.

The above explanation indicates an outline of the exit path guidance in a rotary intersection guidance according to the second embodiment. The following explains an example of each process of S204 to S209 with reference to FIGS. 5A to 7C.

(1) An Example of a Learned Road which Passes Through an Inside or an Outside of the Rotary Intersection (S204).

Figure 5A:
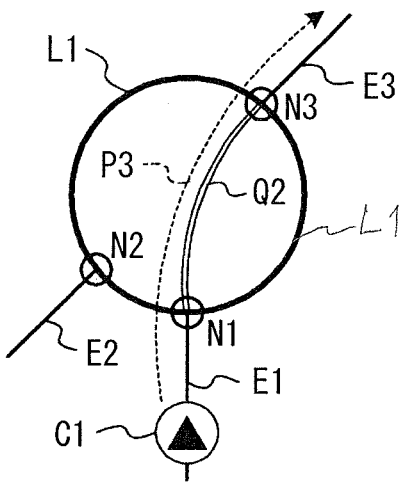
FIGS. 5A, 5B are diagrams illustrating configurations of connections of learned roads in rotary intersections, respectively.
Figure 5B:
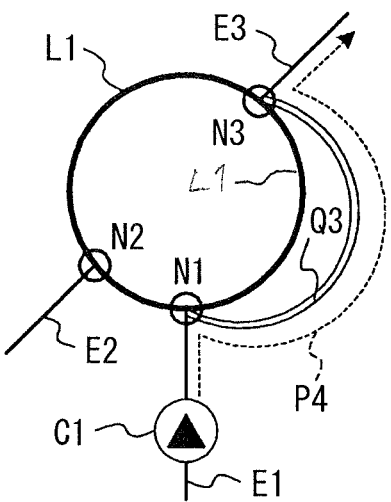

FIGS. 5A, 5B indicate schematically examples of the routes of passing through the rotary intersection. As explained above, L1 is a link of a rotary or cyclic part of the rotary intersection. C1 indicates a present position of the subject vehicle. Each of N1, N2, and N3 indicates an existing node that is a node to which an existing road in the conventional map data connects. Of those nodes N1, N2, N3, the node N1 is an existing node equivalent to an entrance port of the rotary intersection; the node N1 is connected to the link E1 of the existing road. Each of N2 and N3 is an existing node equivalent to an exit port of the rotary intersection. The node N2 is connected to the link E2 of an existing road. The node N3 is connected to the link E3 of an existing road.

In FIG. 5A, Q2 is a link of a learned road registered by the road learning function; the link Q2 passes through an inside of the rotary intersection, and connects existing nodes N1 and N3 therebetween. The guidance route P3 passes through the link E1 of the existing road and enters the rotary intersection via the entrance port of the existing node N1. Further, the guidance route P goes straight to pass through the link Q2 of the learned road to thereby pass across the rotary intersection, and exit the rotary intersection via the exit port of the existing node N3 to the link E3 of the existing road.

When the subject vehicle C1 travels along the guidance route P3, it passes across the rotary intersection. The subject vehicle C1 may run a private road or private site such as a parking lot; it may travel a shortcut against a regulation. Therefore, when it is determined that the learned road corresponding to the exit path passes through an inside of the cyclic part of the rotary intersection at S204, the exit path guidance for the learned road is not executed.

However, if there is a certain premise that the learned road passing through an inside of the rotary intersection is a public road, the exit path guidance for learned roads may be exceptionally made. For example, when the learned road passes through a specific point (e.g., a central point) of the rotary intersection, it is determined that a public road is prepared as a byroad, thereby executing the exit path guidance for learned roads. Alternatively, there may be a case of acquiring information indicating that the learned road is a public road. Such information includes a road sign captured by an in-vehicle camera (unshown) or route information acquired from an external source by a communication apparatus (unshown). In such a case, the exit path guidance for learned roads may be executed. One example of the guidance may be made by the message of "passing through the inside road of the rotary intersection via the exit port of OO".

In FIG. 5B, Q3 is a link of a learned road registered by the road learning function; the link Q3 passes through an outside of the rotary intersection, and connects existing nodes N1 and N3 therebetween. The guidance route P4 travels the link E of an existing road and enters the link Q3 from the existing node N1. Further, the guidance route P4 passes through the outside of the rotary intersection, and exits from the exit port of the existing node N3 to the link E3 of the existing road. The guidance route P4 travels outside of the rotary intersection; thus, an exit path guidance is made variably in responding to the connection configuration of the learned road.

(2) Example of Addition Type Learned Road (S205, S208)

Figure 6A:
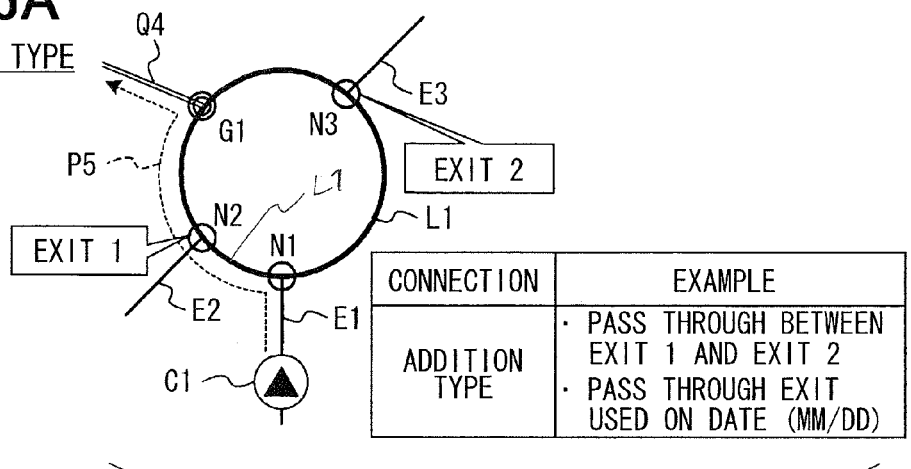
FIGS. 6A, 6B, 6C are diagrams illustrating configurations of connections of learned roads in rotary intersections, respectively.

FIG. 6A indicates an example of an exit path guidance which guides an addition type learned road in a rotary intersection. L1 is a link of a rotary or cyclic part of the rotary intersection, like the mentioned above. C1 indicates a present position of the subject vehicle. Each of N1, N2, and N3 indicates an existing node that is a node to which an existing road in the conventional map data connects. N1 is an existing node equivalent to an entrance port of the rotary intersection. Each of N2 and N3 is an existing node equivalent to an exit port of the rotary intersection. The existing nodes N1, N2, N3 are connected with the links E1, E2, E3 of the existing roads, respectively.

G1 is a learned node that is a node to which a learned road registered by the road learning function is connected. The learned road G1 is added in between two exit ports of the existing nodes N2, N3. This learned node G1 is equivalent to an exit port of the rotary intersection, and connected with the link Q4 of the learned road. The guidance route P5 passes through the link E1 of an existing road, enters the rotary intersection from the entrance port of the existing node N1, passes through the and exits via the exit port of the learned node G1 to the link Q4 of a learned road.

As explained above, in the guidance route P5, the learned node G1 at which the learned road Q4 of an exit path is connected with the rotary intersection is located in between other two existing nodes N2 and N3 on L1 of the rotary intersection. Such a configuration of the connection is determined as "addition type."

This exit path guidance corresponding to the connection of "addition type" uses the exit port numbers to identify exit ports that sandwich the exit port via which the guidance route exits from the rotary intersection, for instance, "passing through the exit port in between the exit port 1 and the exit port 2." The exit port numbers presented in this guidance are assigned to only the exit ports to which the existing roads are connected, and designated as the consecutive numbers in an order closer to the entrance port as follows. The existing node N2 is assigned with "exit port 1", and the existing node N3 is assigned with "exit port 2." Thus, the learned road of the exit port path is presented on a basis of the exit ports previously registered in the conventional map data. The user can thus understand that the guidance route exist from the exit port registered by the road learning function.

Further, there is another exit port of another learned road existing besides the learned road of the exit path used as the candidate for guidance in between the exit ports of two existing nodes in the case of the exit path guidance for addition type learned road. In such a case, an easy-to-understand guidance manner may be achieved so as to indicate which learned road should be used as follows.

For example, the exit port numbers that are previously registered in the conventional map data are further subdivided into individual exit port numbers; then, the individual exit port numbers are assigned to the several learned roads connected to the rotary intersection. Out of the assigned exit port numbers, the exit port number of the learned road from which the subject vehicle should exit may be presented for the exit path guidance. Thus, the learned road corresponding to the exit path can be certainly distinguished from the other several learned roads.

Alternatively, "please pass through the exit port which was used to exit from the rotary intersection on the date of nth month nth day (the data MM/DD)" may presented. That is, the date (date when the learning was made) when the subject vehicle previously passed through the learned road, which the guidance route is going to use as an exit path at this time, may be used for presenting the exit path. Further, the exit path may be presented by using the name of the destination or POI (Point Of Interest) that was designated in association with the route guidance process in the navigation apparatus when the subject vehicle passed through in past times. The information of the date when the learning was made, or the name of the destination or POI at that time may be recorded as auxiliary data attached to the learned road data, and used as needed.

Thus, the exit path guidance is executed by presenting information relevant to the state when the subject vehicle traveled in the past. The learned road to which the subject vehicle should exit from the rotary intersection is easily distinguishable based on the memory in those days recollected from the information.

(3) Example of Branch Type Learned Road (S206, S209)

Figure 6B:
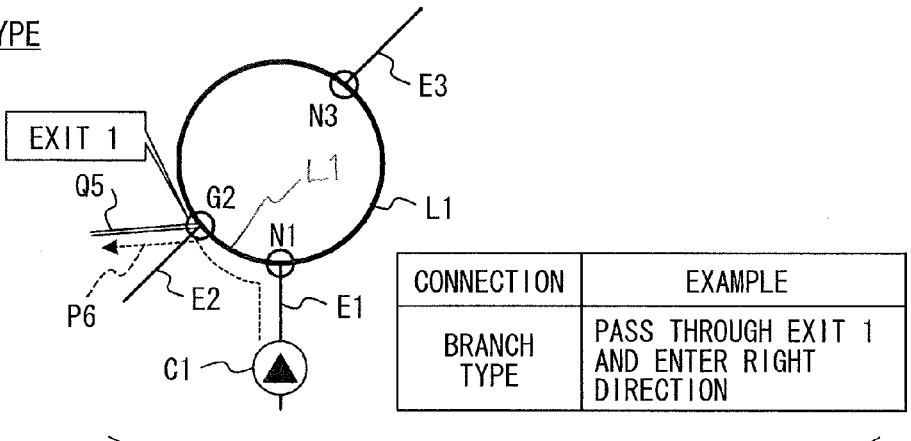

FIG. 6B indicates an example of an exit path guidance which guides a branch type learned road in a rotary intersection. L1 is a link of a rotary or cyclic part of the rotary intersection, like the mentioned above. C1 indicates a present position of the subject vehicle. N1 is an existing node which an existing road in the conventional map data is connected with, and is equivalent to an entrance port of the rotary intersection. This existing node N1 is connected with the link E1 of an existing road. G2 is an existing node connected with the link E2 of an existing road; further, this node G2 is simultaneously connected with a learned link Q5 (serving as an exit path) registered by the road learning function. The node G2 can be referred to as a common node. The guidance route P6 passes through the link E1 of an existing road, enters the rotary intersection via the entrance port of an existing node N1, passes through the L1, and exits via the common node G2 to the link Q5 of a learned road.

As explained above, in this guidance route P6, the node G2 at a position where to connect with the link E2 of an existing road serving as an exit path is also connected with the link Q5 of a learned road that is a target of the exit path guidance; the single exit port branches into more than one exit path. Such a configuration of the connection is determined as being "branch type."

The exit path guidance responding to the connection configuration of "branch type" is exemplified as a message "please pass through the exit port 1 and then take or enter a right direction." That is, the guidance presents explicitly the exit port number so as to indicate which exit port the route passes through and which direction the route takes after the indicated exit port. The exit port number presented by this guidance is assigned only to an exit port to which an exit path of an existing road is connected. The node G2 nearest to the entrance port is designated as "exit port 1." Thus, the learned road of the exit path is presented or guided based on the exit port previously registered in the conventional map data and indicated by a heading direction from the exit port. The user can thus understand that the guidance route exits from the exit port registered by the road learning function.

(4) Example of Proximity Type Learned Road (S210)

Figure 6C:
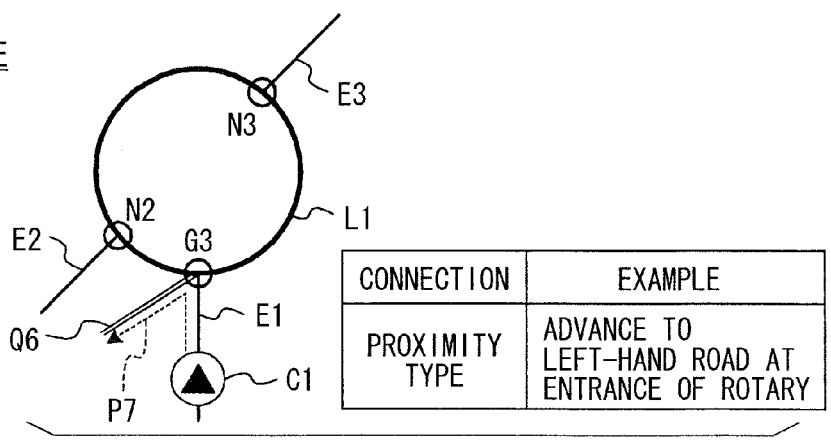

FIG. 6C indicates an example of an exit path guidance which guides a proximity type learned road in a rotary intersection. L1 is a link of a rotary or cyclic part of the rotary intersection, like the mentioned above. C1 indicates a present position of the subject vehicle. G3 is an existing node of an entrance port connected with the link E1 of an existing road; further, this node G2 is simultaneously connected with a learned link Q6 (serving as an exit path) registered by the road learning function. The node G2 can be referred to as an entrance-exit-dual use node. P7 is a guidance route which passes through the link E1 of an existing road and exits from the node entrance-exit-dual use node G3 to the link Q6 of a learned road.

In the guidance route P7, the node G3 at a position where to connect with the link E1 of an existing road serving as an entrance path is also connected with the link Q6 of an learned road that is a target of the exit path guidance. When an entrance path and an exit path is close to each other in the entrance port/exit port, it is determined that the configuration of the connection is a proximity type.

For instance, the exit path guidance corresponding to the connection configuration of "proximity type" presents a massage "please pass through the left-hand road at the entrance port of the rotary." That is, the guidance of the exit path is made by presenting (i) the information on the entrance port to the rotary intersection and (ii) the heading direction from the entrance port to the learned road corresponding to the exit path. Thus, the learned road of the exit path is presented or guided by indicating a heading direction from the entrance port based on the entrance port previously registered in the conventional map data. The user can thus understand that the guidance route exits from a learned road registered by the road learning function.

(5) Difference of "Addition Type", "Branch Type", and "Proximity Type"

Figure 7A:
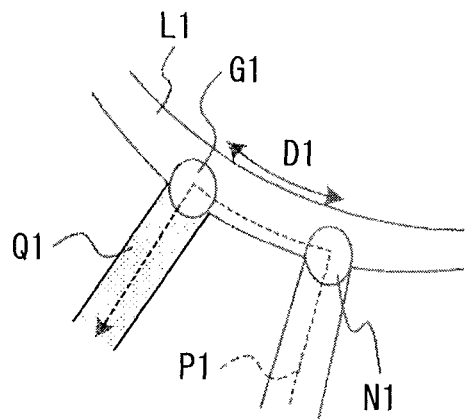
FIGS. 7A, 7B, 7C are diagrams illustrating configurations of connections of learned roads, respectively.
Figure 7B:
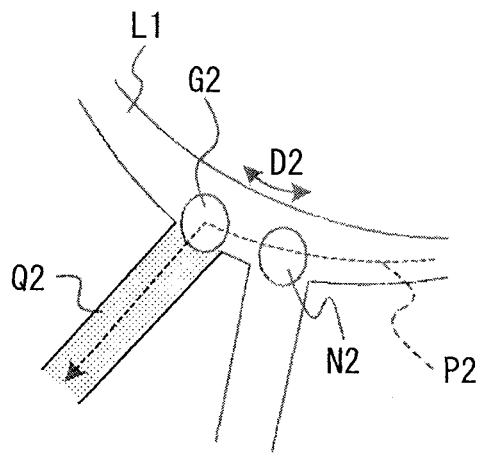
Figure 7C:
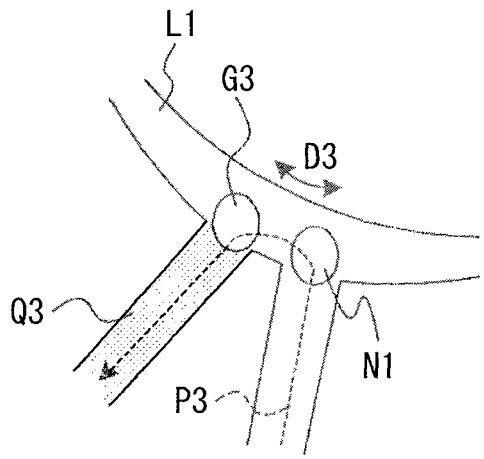

FIGS. 7A, 7B, 7C are diagram illustrating each configuration of connection of "addition type," "branch type," and "proximity type." Signs L1, N1 to N2, G1 to G3, Q1 to Q3, P1 to P3 attached to each part in FIGS. 7A to 7C have the same meaning as those of the previously mentioned signs; thus, the explanation is omitted for preventing duplicate.

FIG. 7A illustrates an example of the "addition type." FIG. 7B illustrates an example of the "branch type." FIG. 7C illustrates an example of the "proximity type." In FIGS. 7A to 7C, D1 to D3 indicate distances between the nodes G1 to G3 of the exit ports to which the learned roads are connected and the nodes N1 to N2 of the entrance port or exit port to which the existing road is connected, respectively. The (i) addition type, and the (ii) branch type/proximity type are distinguished by the lengths of the distances D1 to D3. When the distance D1 is long (i.e., longer than a predetermined value), the connection configuration is classified into the addition type. When the distance D2 and D3 are short (shorter than a predetermined value) or when the two nodes are the same one, (zero distance), the connection configuration is classified into the branch type or the proximity type.

[Effect]

According to the navigation apparatus 1 of the present embodiment, the following effects may be obtained. The exit path as a target for a route guidance in a rotary intersection is differentiated in a guidance method depending on either by corresponding to an existing road in the conventional map data or by corresponding to a learned road acquired by the road learning function, respectively.

Under the above configuration, even when a learned road connected with a rotary intersection is added to or deleted from the rotary intersection, the guidance information is kept unchanged in the contents of the information when the guidance route passes through an exit path of an existing road in the conventional map data. This prevents the confusion of the user. In addition, it becomes easy and convenient for the user to recognize that the guided exit path is a learned road.

Aspects of the disclosure described herein are set out in the following clauses.

As an aspect of the disclosure, a navigation apparatus in a vehicle is provided for executing a route guidance using a ready-made map data and a learned road data. The learned road data records a learned road that is generated based on a travel track that ranges from a position located when a present position of the vehicle separates from an existing road in the map data or an already registered learned road already recorded in the learned road data up to a position located when a present position of the vehicle returns to an existing road in the map data or an already registered learned road already recorded in the learned road data. The navigation apparatus is further provided as follows. A guidance section is included to present an exit path guidance relative to an exit path of a guidance target via which the vehicle is to exit from a rotary intersection at a predetermined time point when a designated guidance route is to pass through the rotary intersection and exit from the rotary intersection via the exit path of the guidance target. A determination section is included to determine whether an exit path of a guidance target by the guidance section for exiting from the rotary intersection corresponds to (i) an existing road stored in the map data or (ii) a learned road recorded in the learned road data. The guidance section is further configured to execute an exit path guidance in line with a rotary intersection guidance of a predetermined mode based on the map data when the exit path of the guidance target is determined to correspond to an existing road stored in the map data, and to execute an exit path guidance in line with a rotary intersection guidance of a learned road guidance mode different from the predetermined mode when the exit path of the guidance target is determined to correspond to a learned road recorded in the learned road data.

As a second aspect as an optional aspect of the disclosure, the guidance section may execute the exit path guidance in line with the rotary intersection guidance of, as the predetermined mode, an exit port number mode that presents an exit port number of the exit path of the guidance target, out of exit port numbers which are assigned to exit paths of a plurality of existing roads included in the rotary intersection, when the exit path of the guidance target is determined to correspond to an existing road stored in the map data; and the guidance section may execute the exit path guidance with the rotary intersection guidance of, as the learned road guidance mode, presenting a position of the exit path of the guidance target without presenting an exit port number corresponding to the learned road, when the exit path of the guidance target is determined to correspond to a learned road recorded in the learned road data.

As a third aspect as an optional aspect of the disclosure, the guidance section may determine a configuration of connection of the learned road with the rotary intersection, when the exit path of the guidance target is determined to correspond to a learned road recorded in the learned road data; and the guidance section may execute the exit path guidance using the learned road guidance mode responding to the determined configuration of connection.

As a fourth aspect as an optional aspect of the above navigation apparatus, the guidance section may not execute any exit path guidance with respect to a learned road when the configuration of connection of the learned road is determined to be a road that passes through an inside of a cyclic part of the rotary intersection.

Furthermore, as a fifth aspect as an optional aspect in the foregoing navigation apparatus, the guidance section may execute the exit path guidance with respect to a learned road as long as the learned road satisfies an exceptional condition even when the configuration of connection of the learned road is determined to be a road that passes through the inside of the cyclic part of the rotary intersection.

As a sixth aspect as an optional aspect of the disclosure, the guidance section may execute the exit path guidance by guiding the vehicle to exit via an exit port located in between two connection positions of two existing roads, when determining that a connection position of a learned road corresponded to by an exit path of the guidance target with the rotary intersection satisfies a configuration of connection of an addition type in which the learned road is located in between two connection positions of two existing roads connected with the rotary intersection, as a result of determining the configuration of connection of the learned road corresponded to by the exit path of the guidance target.

As a seventh aspect as an optional aspect of the above navigation apparatus, in cases where (i) a learned road corresponded to by the exit path of the guidance target satisfies the condition of the configuration of connection of the addition type and (ii) several learned roads are connected with the rotary intersection in between the two connection positions of the two existing roads, the guidance section may assign the several learned roads with different individual exit port numbers that are different from the exit port numbers assigned to the two existing roads; and the guidance section may execute an exit path guidance by presenting a different individual exit port number assigned to the learned road corresponded to by the exit path of the guidance target, out of the different individual exit port numbers.

As an eighth aspect as an optional aspect of the foregoing navigation apparatus, the different individual exit port numbers assigned to the several learned roads may be generated by subdividing the exit port numbers assigned to the two existing roads.

As a ninth aspect as an optional aspect of the above navigation apparatus, in cases where (i) the learned road corresponded to by the exit path of the guidance target satisfies a condition of the configuration of connection of the addition type and (ii) several learned roads are connected with the rotary intersection in between the two connection positions of the two existing roads, the guidance section may execute an exit path guidance by presenting a date and time or a name that is associated with the learned road corresponded to by the exit path of the guidance target. The date and time correspond to a date and time when the vehicle previously passed through the learned road. The name is a destination or a point of interest which was previously associated with a route guidance designated by the navigation apparatus.

As a tenth aspect as an optional aspect of the disclosure, the guidance section may execute the exit path guidance by presenting (i) information on an exit port of an existing road and a heading direction from the exit port to a learned road corresponded to by an exit path of the guidance target when determining that a connection position of the learned road to the rotary intersection satisfies a configuration of connection of a branch type in which a connection position of the learned road with the rotary intersection is identical to a connection position of the existing road with the rotary intersection, as a result of determining the configuration of connection of the learned road corresponded to by the exit path of the guidance target.

As an eleventh aspect as an optional aspect of the above navigation apparatus, the guidance section may distinguish the configuration of connection between the addition type and the branch type depending on a distance between (i) the connection position at which the learned road corresponded to by the exit path is connected with the rotary intersection, and (ii) the connection position at which an exit path of an existing road is connected with the rotary intersection.

As a twelfth aspect as an optional aspect of the disclosure, the guidance section may execute the exit path guidance by presenting information on an entrance port to the rotary intersection and a heading direction from the entrance port to a learned road corresponded to by an exit path of the guidance target, when determining that a connection position of the learned road to the rotary intersection satisfies a configuration of connection of a proximity type in which the connection position of the learned road is identical to a connection position of an entrance path to the rotary intersection, as a result of determining the configuration of connection of a learned road corresponded to by the exit path, the connection position of the learned road and the entrance path being associated with the information on the entrance port.

As a thirteenth aspect as an optional aspect of the above navigation apparatus, the guidance section may distinguish the configuration of connection between the addition type and the proximity type depending on a distance between (i) the connection position at which the learned road corresponded to by the exit path is connected with the rotary intersection, and (ii) the connection position at which the entrance path is connected with the rotary intersection.

It will be obvious to those skilled in the art that various changes may be made in the above-described embodiments of the present invention. However, the scope of the present invention should be determined by the following claims.

What is claimed:

1. A navigation apparatus in a vehicle for executing a route guidance using a ready-made map data and a learned road data, the learned road data recording a learned road that is generated based on a travel track that ranges from a position located when a present position of the vehicle separates from an existing road in the map data or an already registered learned road already recorded in the learned road data up to a position located when a present position of the vehicle returns to an existing road in the map data or an already registered learned road already recorded in the learned road data, the navigation apparatus comprising:
 a guidance section to present an exit path guidance relative to an exit path of a guidance target via which the vehicle is to exit from a rotary intersection at a predetermined time point when a designated guidance route is to pass through the rotary intersection and exit from the rotary intersection via the exit path of the guidance target; and
 a determination section to determine whether an exit path of a guidance target by the guidance section for exiting from the rotary intersection corresponds to (i) an existing road stored in the map data or (ii) a learned road recorded in the learned road data, the guidance section being further configured
to execute an exit path guidance in line with a rotary intersection guidance of a predetermined mode based on the map data when the exit path of the guidance target is determined to correspond to an existing road stored in the map data, and
to execute an exit path guidance in line with a rotary intersection guidance of a learned road guidance mode different from the predetermined mode when the exit path of the guidance target is determined to correspond to a learned road recorded in the learned road data.

2. The navigation apparatus according to claim 1, wherein:
the guidance section executes the exit path guidance in line with the rotary intersection guidance of, as the predetermined mode, an exit port number mode that presents an exit port number of the exit path of the guidance target, out of exit port numbers which are assigned to exit paths of a plurality of existing roads included in the rotary intersection, when the exit path of the guidance target is determined to correspond to an existing road stored in the map data; and
the guidance section executes the exit path guidance with the rotary intersection guidance of, as the learned road guidance mode, presenting a position of the exit path of the guidance target without presenting an exit port number corresponding to the learned road, when the exit path of the guidance target is determined to correspond to a learned road recorded in the learned road data.

3. The navigation apparatus according to claim 1, wherein:
the guidance section determines a configuration of connection of the learned road with the rotary intersection, when the exit path of the guidance target is determined to correspond to a learned road recorded in the learned road data; and
the guidance section executes the exit path guidance using the learned road guidance mode responding to the determined configuration of connection.

4. The navigation apparatus according to claim 3, wherein the guidance section does not execute any exit path guidance with respect to a learned road when the configuration of connection of the learned road is determined to be a road that passes through an inside of a cyclic part of the rotary intersection.

5. The navigation apparatus according to claim 4, wherein the guidance section executes the exit path guidance with respect to a learned road as long as the learned road satisfies an exceptional condition even when the configuration of connection of the learned road is determined to be a road that passes through the inside of the cyclic part of the rotary intersection.

6. The navigation apparatus according to claim 3, wherein the guidance section executes the exit path guidance by guiding the vehicle to exit via an exit port located in between two connection positions of two existing roads, when determining that a connection position of a learned road corresponded to by an exit path of the guidance target with the rotary intersection satisfies a configuration of connection of an addition type in which the learned road is located in between two connection positions of two existing roads connected with the rotary intersection, as a result of determining the configuration of connection of the learned road corresponded to by the exit path of the guidance target.

7. The navigation apparatus according to claim 6, wherein:
in cases where (i) a learned road corresponded to by the exit path of the guidance target satisfies the condition of the configuration of connection of the addition type and (ii) several learned roads are connected with the rotary intersection in between the two connection positions of the two existing roads, the guidance section assigns the several learned roads with different individual exit port numbers that are different from the exit port numbers assigned to the two existing roads; and the guidance section executes an exit path guidance by presenting a different individual exit port number assigned to the learned road corresponded to by the exit path of the guidance target, out of the different individual exit port numbers.

8. The navigation apparatus according to claim 7, wherein:
the different individual exit port numbers assigned to the several learned roads are generated by subdividing the exit port numbers assigned to the two existing roads.

9. The navigation apparatus according to claim 6, wherein in cases where (i) the learned road corresponded to by the exit path of the guidance target satisfies a condition of the configuration of connection of the addition type and (ii) several learned roads are connected with the rotary intersection in between the two connection positions of the two existing roads, the guidance section executes an exit path guidance by presenting a date and time or a name that is associated with the learned road corresponded to by the exit path of the guidance target, the date and time corresponding to a date and time when the vehicle previously passed through the learned road, the name being a destination or a point of interest which was previously associated with a route guidance designated by the navigation apparatus.

10. The navigation apparatus according to claim 3, wherein the guidance section executes the exit path guidance by presenting (i) information on an exit port of an existing road and a heading direction from the exit port to a learned road corresponded to by an exit path of the guidance target when determining that a connection position of the learned road to the rotary intersection satisfies a configuration of connection of a branch type in which a connection position of the learned road with the rotary intersection is identical to a connection position of the existing road with the rotary intersection, as a result of determining the configuration of connection of the learned road corresponded to by the exit path of the guidance target.

11. The navigation apparatus according to claim 10, wherein:
the guidance section executes the exit path guidance by guiding the vehicle to exit via an exit port located in between two connection positions of two existing roads, when determining that a connection position of a learned road corresponded to by an exit path of the guidance target with the rotary intersection satisfies a configuration of connection of an addition type in which the learned road is located in between two connection positions of two existing roads connected with the rotary intersection, as a result of determining the configuration of connection of the learned road corresponded to by the exit path of the guidance target; and the guidance section distinguishes the configuration of connection between the addition type and the branch type depending on a distance between (i) the connection position at which the learned road corresponded to by the exit path is connected with the rotary intersection, and (ii) the connection position at which an exit path of an existing road is connected with the rotary intersection.

12. The navigation apparatus according to claim 3, wherein the guidance section executes the exit path guidance by presenting information on an entrance port to the rotary intersection and a heading direction from the entrance port to a learned road corresponded to by an exit path of the guidance target, when determining that a connection position of the learned road to the rotary intersection satisfies a configuration of connection of a proximity type in which the connection position of the learned road is identical to a connection position of an entrance path to the rotary intersection, as a result of determining the configuration of connection of a learned road corresponded to by the exit path, the connection position of the learned road and the entrance path being associated with the information on the entrance port.

13. The navigation apparatus according to claim 12, wherein:
the guidance section executes the exit path guidance by guiding the vehicle to exit via an exit port located in between two connection positions of two existing roads, when determining that a connection position of a learned road corresponded to by an exit path of the guidance target with the rotary intersection satisfies a configuration of connection of an addition type in which the learned road is located in between two connection positions of two existing roads connected with the rotary intersection, as a result of determining the configuration of connection of the learned road corresponded to by the exit path of the guidance target; and the guidance section distinguishes the configuration of connection between the addition type and the proximity type depending on a distance between (i) the connection position at which the learned road corresponded to by the exit path is connected with the rotary intersection, and (ii) the connection position at which the entrance path is connected with the rotary intersection.

14. A method for executing an exit path from a rotary intersection by a navigation apparatus in a vehicle by using a ready-made map data and a learned road data, the learned road data recording a learned road that is generated based on a travel track that ranges from a position located when a present position of the vehicle separates from an existing road in the map data or an already registered learned road up to a position located when a present position of the vehicle returns to an existing road in the map data or an already registered learned road, the method comprising:
designating a guidance route to pass through a rotary intersection and exit from the rotary intersection via an exit path of a guidance target;

determining whether an exit path of the guidance target in the designated guidance route for exiting from the rotary intersection corresponds to (i) an existing road stored in the map data or (ii) a learned road recorded in the learned road data; and executing an exit path guidance in line with a rotary intersection guidance of a predetermined mode based on the map data when the exit path of the guidance target is determined to correspond to an existing road stored in the map data, whereas executing an exit path guidance in line with a rotary intersection guidance of a learned road guidance mode different from the predetermined mode when the exit path of the guidance target is determined to correspond to a learned road recorded in the learned road data.

* * * * *